United States Patent
Viering et al.

(10) Patent No.: US 12,267,260 B2
(45) Date of Patent: Apr. 1, 2025

(54) SYNCHRONIZATION SIGNALING BLOCK COMPATIBLE INTERFERENCE COORDINATION PATTERNS TO REDUCE INTERFERENCE IN WIRELESS NETWORKS

(71) Applicant: Nokia Technologies Oy, Espoo (FI)

(72) Inventors: Ingo Viering, Munich (DE); Mikko Säily, Laukkoski (FI); Jorma Johannes Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 599 days.

(21) Appl. No.: 17/625,169

(22) PCT Filed: Jul. 15, 2019

(86) PCT No.: PCT/IB2019/056025
§ 371 (c)(1),
(2) Date: Jan. 6, 2022

(87) PCT Pub. No.: WO2021/009538
PCT Pub. Date: Jan. 21, 2021

(65) Prior Publication Data
US 2022/0263615 A1    Aug. 18, 2022

(51) Int. Cl.
*H04L 5/00* (2006.01)
(52) U.S. Cl.
CPC .......... *H04L 5/0032* (2013.01); *H04L 5/0048* (2013.01)
(58) Field of Classification Search
None
See application file for complete search history.

(56) References Cited

U.S. PATENT DOCUMENTS

| | | | | |
|---|---|---|---|---|
| 2018/0213493 A1* | 7/2018 | Chakraborty | ........ | H04J 11/0053 |
| 2019/0069256 A1* | 2/2019 | Jung | ................. | H04W 56/0015 |
| 2019/0230534 A1* | 7/2019 | John Wilson | ......... | H04W 24/08 |
| 2019/0306915 A1* | 10/2019 | Jin | ......................... | H04W 76/28 |
| 2019/0349885 A1* | 11/2019 | Koskela | ................ | H04W 24/08 |
| 2019/0350003 A1* | 11/2019 | Jang | ....................... | H04L 1/0005 |

(Continued)

FOREIGN PATENT DOCUMENTS

| | | | | |
|---|---|---|---|---|
| GB | 2580050 A | * | 7/2020 | .......... H04W 56/001 |
| WO | 2019/098914 A1 | | 5/2019 | |

OTHER PUBLICATIONS

Hämäläinen et al., "LTE Self-organizing Networks (SON): Network Management Automation for Operational Efficiency", Wiley Publication, Jan. 2012, 422 pages.

(Continued)

*Primary Examiner* — Christopher T Wyllie
(74) *Attorney, Agent, or Firm* — Barta Jones, PLLC

(57) ABSTRACT

According to an example embodiment, a method may include determining, by a first base station associated with a first cell based on a synchronization signal block (SSB) configuration indicating one or more resources on which a synchronization signal block (SSB) may be transmitted by a second cell, one or more interference protected resources on which the first cell will reduce interference towards the second cell; and sending, by the first base station associated with the first cell to a second base station associated with the second cell, information identifying the one or more interference protected resources on which the first cell will reduce interference towards the second cell.

18 Claims, 10 Drawing Sheets

(56) References Cited

U.S. PATENT DOCUMENTS

| | | | | |
|---|---|---|---|---|
| 2020/0076568 | A1* | 3/2020 | Nguyen | H04L 7/042 |
| 2020/0145939 | A1* | 5/2020 | Harada | H04W 56/001 |
| 2020/0221403 | A1* | 7/2020 | Gao | H04W 72/0446 |
| 2020/0366452 | A1* | 11/2020 | Tang | H04L 5/0057 |
| 2020/0374847 | A1* | 11/2020 | Liu | H04L 5/0053 |
| 2020/0413356 | A1* | 12/2020 | Wang | H04W 72/046 |
| 2021/0176655 | A1* | 6/2021 | Qi | H04W 40/24 |
| 2022/0174630 | A1* | 6/2022 | Wei | H04W 56/0015 |
| 2022/0263615 | A1* | 8/2022 | Viering | H04L 5/0032 |
| 2024/0251366 | A1* | 7/2024 | Li | H04B 17/328 |

OTHER PUBLICATIONS

"3rd Generation Partnership Project; Technical Specification Group Radio Access Network; NG-RAN; Xn application protocol (XnAP) (Release 15)", 3GPP TS 38.423, V15.3.0, Mar. 2019, pp. 1-294.

"WID on Multi-RAT Dual-Connectivity and Carrier Aggregation enhancements (LTE_NR_DC_CA_enh-Core)", 3GPP TSG-RAN#81, RP-182076, Agenda: 9.2.2, Ericsson, Sep. 10-13, 2018, 5 pages.

International Search Report and Written Opinion received for corresponding Patent Cooperation Treaty Application No. PCT/IB2019/056025, dated Mar. 26, 2020, 12 pages.

* cited by examiner

SYNCHRONIZATION SIGNALING BLOCK COMPATIBLE INTERFERENCE COORDINATION PATTERNS TO REDUCE INTERFERENCE IN WIRELESS NETWORKS

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include determining, by a first base station associated with a first cell based on a synchronization signal block (SSB) configuration indicating one or more resources on which a synchronization signal block (SSB) may be transmitted by a second cell, one or more interference protected resources on which the first cell will reduce interference towards the second cell; and sending, by the first base station associated with the first cell to a second base station associated with the second cell, information identifying the one or more interference protected resources on which the first cell will reduce interference towards the second cell.

According to an example embodiment, an apparatus may include means for determining, by a first base station associated with a first cell based on a synchronization signal block (SSB) configuration indicating one or more resources on which a synchronization signal block (SSB) may be transmitted by a second cell, one or more interference protected resources on which the first cell will reduce interference towards the second cell; and means for sending, by the first base station associated with the first cell to a second base station associated with the second cell, information identifying the one or more interference protected resources on which the first cell will reduce interference towards the second cell.

According to an example embodiment, an apparatus may include: at least one processor; and at least one memory including computer program code; the at least one memory and the computer program code configured to, with the at least one processor, cause the apparatus at least to: determine, by a first base station associated with a first cell based on a synchronization signal block (SSB) configuration indicating one or more resources on which a synchronization signal block (SSB) may be transmitted by a second cell, one or more interference protected resources on which the first cell will reduce interference towards the second cell; and send, by the first base station associated with the first cell to a second base station associated with the second cell, information identifying the one or more interference protected resources on which the first cell will reduce interference towards the second cell.

According to an example embodiment, a non-transitory computer-readable storage medium comprising instructions stored thereon that, when executed by at least one processor, are configured to cause a computing system to perform a method of: determining, by a first base station associated with a first cell based on a synchronization signal block (SSB) configuration indicating one or more resources on which a synchronization signal block (SSB) may be transmitted by a second cell, one or more interference protected resources on which the first cell will reduce interference towards the second cell; and sending, by the first base station associated with the first cell to a second base station associated with the second cell, information identifying the one or more interference protected resources on which the first cell will reduce interference towards the second cell.

According to an example embodiment, a method may include: receiving, by a second base station associated with a second cell from a first base station associated with a first cell, information, based on a synchronization signal block configuration, indicating one or more interference protected resources on which the first cell will reduce interference towards the second cell and on which a synchronization signal block (SSB) may be transmitted by the second cell; and transmitting, by the second base station associated with the second cell, a synchronization signal block (SSB) via at least one interference protected resource of the one or more interference protected resources.

According to an example embodiment, an apparatus may include means for receiving, by a second base station associated with a second cell from a first base station associated with a first cell, information, based on a synchronization signal block configuration, indicating one or more interference protected resources on which the first cell will reduce interference towards the second cell and on which a synchronization signal block (SSB) may be transmitted by the second cell; and means for transmitting, by the second base station associated with the second cell, a synchronization signal block (SSB) via at least one interference protected resource of the one or more interference protected resources.

According to an example embodiment, an apparatus may include: at least one processor; and at least one memory including computer program code; the at least one memory and the computer program code configured to, with the at least one processor, cause the apparatus at least to: receive, by a second base station associated with a second cell from a first base station associated with a first cell, information, based on a synchronization signal block configuration, indicating one or more interference protected resources on which the first cell will reduce interference towards the second cell and on which a synchronization signal block (SSB) may be transmitted by the second cell; and transmit, by the second base station associated with the second cell, a synchronization signal block (SSB) via at least one interference protected resource of the one or more interference protected resources.

According to an example embodiment, a non-transitory computer-readable storage medium comprising instructions stored thereon that, when executed by at least one processor, are configured to cause a computing system to perform a method of: receiving, by a second base station associated with a second cell from a first base station associated with a first cell, information, based on a synchronization signal block configuration, indicating one or more interference protected resources on which the first cell will reduce interference towards the second cell and on which a synchronization signal block (SSB) may be transmitted by the second cell; and transmitting, by the second base station associated with the second cell, a synchronization signal block (SSB) via at least one interference protected resource of the one or more interference protected resources.

The details of one or more examples of embodiments are set forth in the accompanying drawings and the description below. Other features will be apparent from the description and drawings, and from the claims.

DETAILED DESCRIPTION

Figure 1:
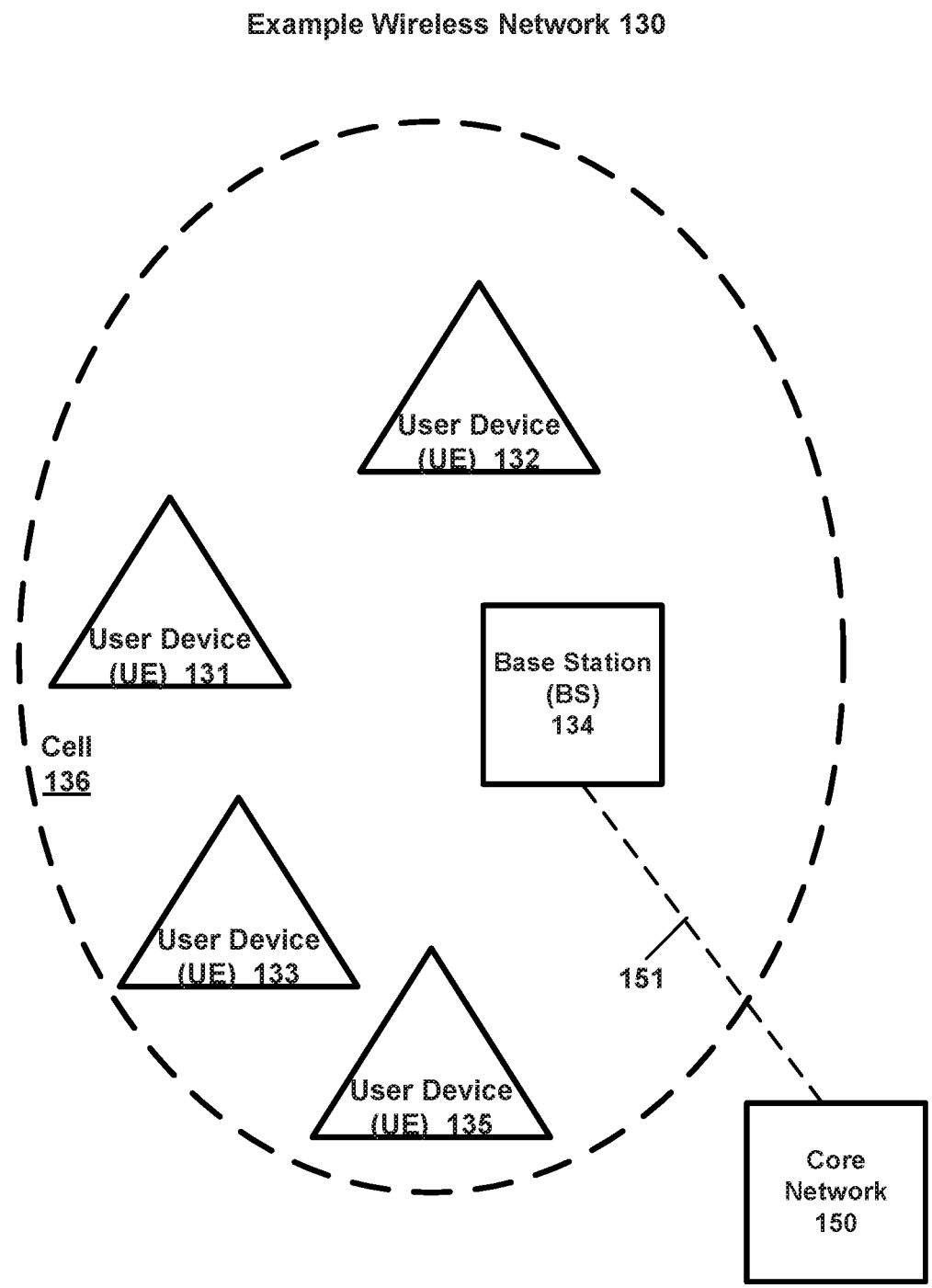
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

Wireless systems may be based upon cells, where a BS (e.g., eNB, gNB) may provide wireless services within one or more cells. Also, the frequency resources of one cell may be reused by adjacent or neighbour cells to maximize efficiency of spectrum usage. However, in some cases, transmissions occurring within one cell may overlap in time and frequency with transmissions within an adjacent or nearby cell. Thus, in some cases, transmissions within a cell may interfere with transmissions of an adjacent cell. This interference may be referred to as inter-cell interference, which may lower the signal to interference plus noise ratio (SINR) associated with these time-frequency resources.

Figure 2:
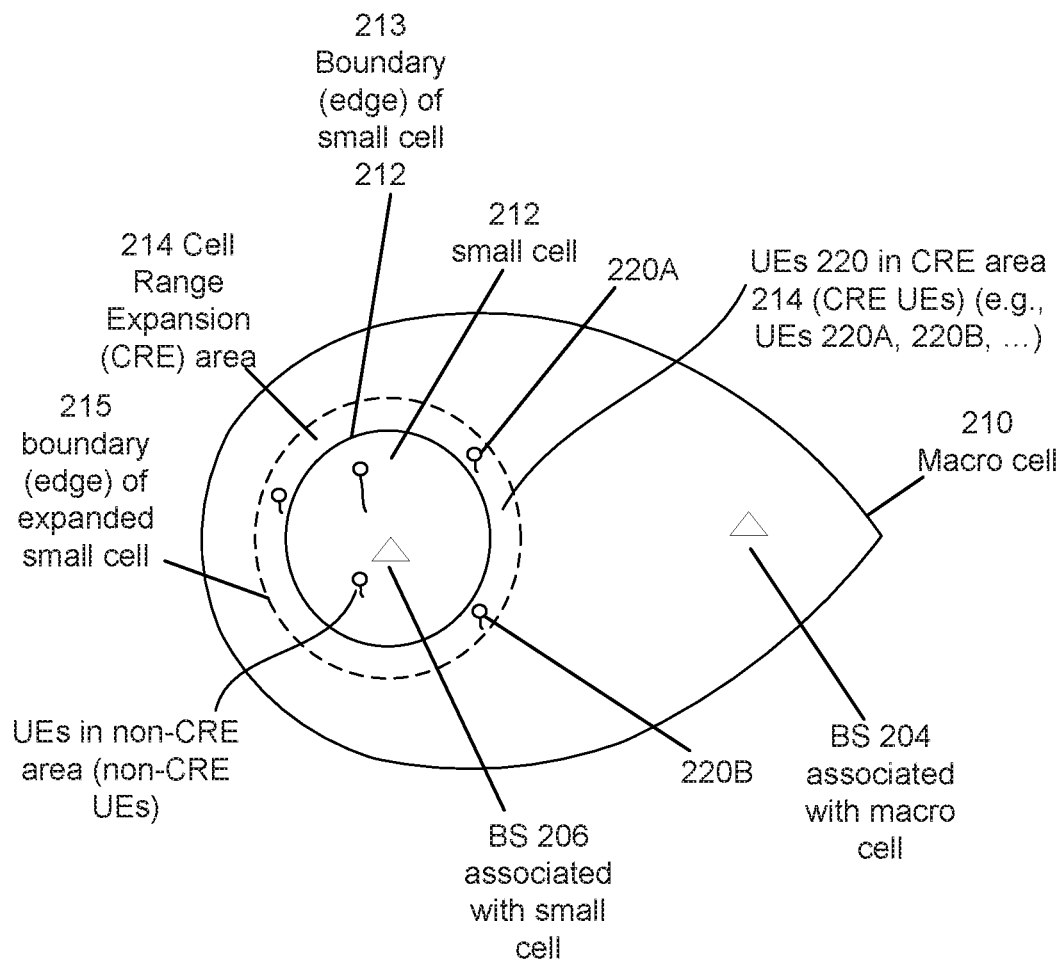
FIG. 2 is a diagram illustrating a macro cell and a small cell according to an example embodiment.

In some cases, one cell may overlap (or even overlay) the coverage area of another cell. FIG. 2 is a diagram illustrating a macro cell and a small cell according to an example embodiment. For example, as shown in FIG. 2, a macro (or large) cell 210 may overlay a small cell 212. BS 204 is associated with (e.g., provides) the macro cell 210, and BS 206 is associated with (provides) the small cell 212. A UE may be connected to one or both of cells 210 and 212. Due to the overlapping coverage area of cells 210 and 212, in some cases (e.g., for at least some time-frequency resources), the signals from macro cell 210 (e.g., signals transmitted from UEs and/or the BS 204 within the macro cell 210) may interfere with small cell 212 (e.g., may cause a decrease in SINR of signals received by UEs or received by a BS 206 within small cell 212). Likewise, signals transmitted from small cell 212 (e.g., signals transmitted from UEs and/or the BS 206 within the small cell 212) may interfere with macro cell 210 (e.g., may cause a decrease in SINR of signals received by UEs or received by BS 204 within macro cell 210).

Furthermore, in some cases, it may be desirable to offload some traffic (data transmissions) and connected UEs from macro cell 210 to small cell 212, e.g., for load balancing, or other purpose. To accomplish this, for example, the cell range of small cell 212 may be expanded (or increased) from small cell 212 (having an outer edge or boundary 213) out to boundary 215 of expanded small cell. The area between the boundary 213 of small cell 212 to boundary 215 of the expanded small cell may be referred to as the cell range expansion (CRE) area 214. Thus, in this example, it may be desirable to cause UEs 220 within the CRE area 214 (e.g., CRE UEs 220A, 220B, . . . ) to perform a handover from macro cell 210 to the (expanded) small cell 212, and to maintain such connection to the small cell 212 (e.g., based on cell measurements). Also, for example, UEs already within small cell 212 (already within boundary 213 of small cell 212) may typically already be connected to small cell 212 (e.g., due to their proximity to BS 206 associated with small cell 212). However, without cell range expansion CRE), those CRE UEs 220 (located outside of boundary 213 and inside of boundary 215) may typically maintain their connection to macro cell 210.

According to an illustrative example embodiment, cell range expansion of small cell 212 may be accomplished, for example, by reducing interference from an aggressor cell (e.g., macro cell 210) towards a victim cell (e.g., small cell 212) for at least one or more interference protected resources. An aggressor cell may be a cell that is causing interference towards a victim cell, and a victim cell may be a cell that is experiencing interference from an aggressor cell. Aggressor cells and victim cells may be any type or size of cells. An interference protected resource may include a resource (e.g., a slot, a subframe and/or a symbol(s), or other resource) for which an aggressor cell has reduced (or will reduce) interference towards the victim cell. On the other hand, an aggressor cell may or may not necessarily reduce interference towards the victim cell on a non-protected resource. Each interference protected resource and/or non-protected resource may be a slot, a subframe, and/or one or more symbols, for example, or other resource. By reducing interference towards the small cell 212 (on the one or more interference protected resources), this may improve the signal strength (e.g., reference signal received power) and/or signal quality (e.g., reference signal received quality RSRQ or SINR) of signals received by CRE UEs 220 from the victim cell, thereby making the expanded small cell a more desirable target cell (e.g., as compared to macro cell 210) for handover for CRE UEs 220. Thus, by reducing interference by the macro (e.g., aggressor) cell 210 towards small (e.g., victim) cell 212, this may allow one or more UEs (e.g., CRE UEs 220A, 220B, . . . ) to establish a connection to the small cell 212, instead of macro cell 210.

According to an example embodiment, the macro cell (e.g., BS 204) may reduce interference towards small cell 212 by omitting or reducing a signal transmission for a particular time, a frequency and/or via a particular beam that would cause interference towards small cell 212 (e.g., that would cause interference with a UE and/or BS 206 of small cell (including the expanded small cell) 212). According to an illustrative example embodiment, time domain interference reduction may be performed by an aggressor cell (e.g., macro cell 210) transmitting a blank subframe (no signals transmitted during such subframe by the aggressor cell), or an almost blank subframe (ABS) subframe which may typically include no transmitted data, but may include some limited signalling or control information, e.g., such as primary synchronization signals (PSS), secondary synchronization signals (SSS), master information block (MIB), system information block 1 (SIB1), and/or cell specific reference signals (CRS). According to another example embodiment, the aggressor cell (e.g., macro cell 210) may reduce interference towards a victim cell (e.g., small cell 212) by transmitting signals via one or more beams, but not using beams that overlap with or are in the direction of (directed towards) the victim cell (e.g., small cell 212). These are some illustrative examples of how an aggressor cell (e.g., macro cell 210) may reduce interference towards a victim cell (e.g., small cell 212). Other interference reduction techniques may be used.

According to an example embodiment, a BS may transmit one or more synchronization signal blocks (SSBs), where each SSB may include, for example, primary synchronization signals (PSS), secondary synchronization signals (SSS) and a physical broadcast channel (PBCH). A UE may use the PSS and SSS to find and synchronize with a BS or cell. The PBCH may include or carry a master information block (MIB) that the UE may use to acquire remaining system information. In some cases, there may be one SSB transmitted per beam, for each of a plurality of beams transmitted by a BS or cell.

Also, for example, a UE may perform signal measurements based on either received channel state information-reference signals (CSI-RS) and/or received SSBs. UE CSI measurements and/or beam failure detection may suffer from the same interference-related problems described herein for RLM. Techniques described herein may be used to allow a UE to obtain and/or measure a reduced-interference signal for a variety of different signals, signal measurements or scenarios. Signal measurements may be performed, e.g., for a UE to report a best set of beams to a BS, to determine when a handover condition is present with respect to a target cell, to report channel state information which allows the serving cell to perform link adaptive scheduling, MIMO (multi-input, multi-output) processing and adaptive modulation and coding, to detect beam failures, and/or to perform radio link monitoring (RLM) of a radio link. For example, a UE may perform various signal measurements, such as measuring a signal quality (e.g., reference signal received quality (RSRQ)) or a signal strength (e.g., a reference signal received power (RSRP)), or other signal measurement such as a signal to interference plus noise ratio (SINR).

For example, Radio Link Monitoring (RLM) may be performed by a UE (e.g., based on CSI-RS signals and/or SSBs) to monitor a radio link condition so that appropriate steps can be taken if a Radio Link Failure (RLF) is detected or declared. For example, as part of RLM, a UE may, based on received SSB signals, determine or declare a radio link failure (RLF) if a measured SINR of the radio link is worse than Qout for more than a time threshold or timer value. For example, if the UE detects or declares a RLF, the UE may then re-initiate cell selection so that the UE may re-establish the connection to a selected cell. According to an example embodiment, for RLM, a UE may measure signals (e.g., determine a signal quality or an average signal quality, such as, for example, a SINR) over one or more SSBs or over repetitions of the same SSB, and then use such signal quality measurement (e.g., average SINR) to perform radio link monitoring, including determining whether a radio link failure has occurred.

However, a problem may arise, for at least some UEs, when performing signal measurements. For example, some UEs (e.g., CRE UEs 220A, 220B, . . . ) may use interference protected resources to measure signals and establish a connection and/or perform a handover to a small cell 212 (or other victim cell). As noted, as part of cell range expansion (CRE), the aggressor cell (e.g., macro cell 210) may reduce interference towards the victim cell (e.g., cell range extended small cell 212) on one or more interference protected resources. However, if such a UE measures signals or performs RLM based on measured SSBs transmitted over non-protected resources (e.g., resources where the macro cell 210 may not reduce interference towards the small cell 212), then the measured signal parameter or signal quality (e.g., SINR or average SINR calculated over a plurality of SSBs or over multiple repetitions of the same SSB transmitted, at least some of which may be transmitted on non-protected resources) may reflect or indicate a very poor (e.g., unacceptable) signal quality (e.g., very poor SINR), which may result in the UE incorrectly declaring a RLF for the radio connection. As noted, the signal measurement or measured signal quality, e.g., SINR, measured based on repetitions of the same SSB received via interference protected resource(s) may be much better (much higher) than a signal measurement (e.g., signal quality such as SINR) measured based on SSBs received via non-protected resource(s). Thus, in such an example case, performing cell measurements and RLM based on signals (e.g., SSBs) received via non-protected resources may cause the UE to declare a radio link failure (RLF) for the radio link between the UE and the small cell 212 although data transmission is efficient and successful on the interference-protected resources.

The cell range expansion (CRE) example is merely one example where interference protected resources may be used. As another illustrative example, some small cells may be available only for a subset of the UEs called "closed subscriber group" (CSG). For example, UEs which are not members of the CSG are not allowed to connect to the small cell. However, if these are in the vicinity of the small cell, they may not be able connect to the macro cell either due to the interference produced by the small cell. In other words, the small cell may create an interference hole for UEs outside the CSG. It is desirable to enable these UEs to access the macro cell despite the small cell interference. In this use case, the small cell may be called the "aggressor", and the macro UE is the "victim". These are merely some illustrative examples of an aggressor cell and victim cell, and where interference protected resources may be used, e.g., to reduce interference towards the victim cell or victim UE.

A UE and BS may receive, or may know in advance, a SSB configuration(s), which may indicate, for example, one or more candidate locations (e.g., resources or locations) for SSBs. Thus, each UE or BS may receive, and/or may be preconfigured with, a SSB configuration (e.g., indicating candidate locations or resources for the possible transmission of a SSB) for one or more possible numbers of SSBs, e.g., for 4 SSBs, 8 SSBs, 64 SSBs, . . . (or other number of SSBs).

Figure 3:
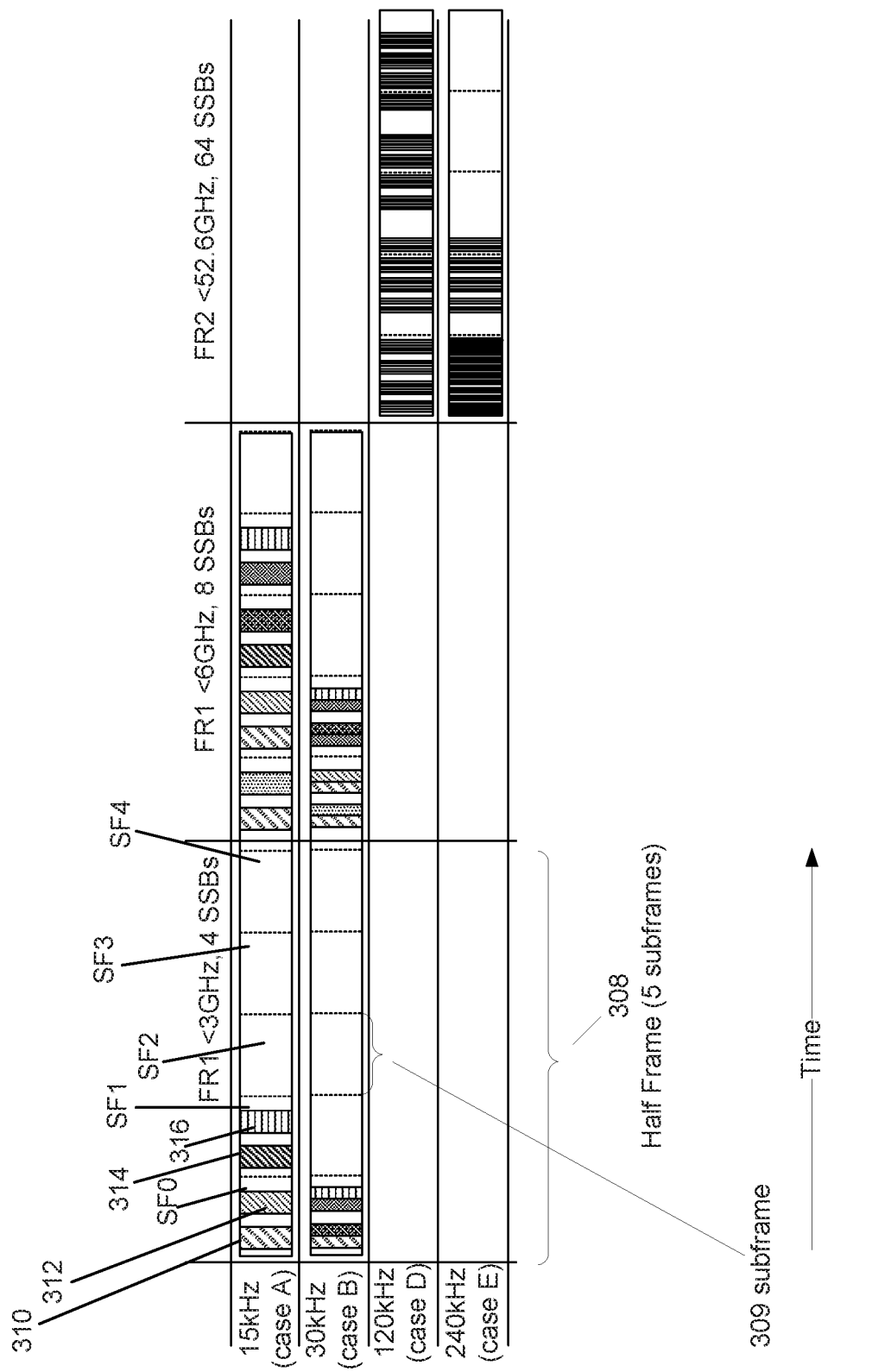
FIG. 3 is a diagram illustrating multiple synchronization signal block (SSB) configurations according to an example embodiment.

FIG. 3 is a diagram illustrating multiple synchronization signal block (SSB) configurations according to an example embodiment. The SSB configuration shown in FIG. 3 illustrates a quantity and location of SSBs for different variations of frequency ranges and subcarrier bandwidths. SSB configurations are shown for three frequency ranges, including frequency range 1 (FR1)<3 GHz with 4 SSBs, FR1<6 GHz with 8 SSBs, and FR2<52.6 GHz with 64 SSBs, and for one or more different subcarrier spacings, e.g., for 15 KHz subcarrier spacing (case A), a 30 KHz subcarrier spacing (case B), a 120 KHz subcarrier spacing (case C), and/or a 240 KHz subcarrier spacing (case E). For one or more of these SSB configurations, the SSB candidate locations (location or resources of possible SSBs) are shown in FIG. 3 (the vertical dotted lines indicate a boundary between subframes). For example, a half frame 308 may include five 1 ms subframes, including subframe 309.

Referring to FIG. 3, for the SSB configuration for FR1<3 GHz, with 4 SSBs, 5 subframes are shown (SF0, SF1, SF2, SF3 and SF4) for the half subframe 308, although an example SSB period (or periodicity) may be, e.g., 20 ms (20 subframes). The 4 SSBs (4 candidate locations for SSBs, allowing up to 4 SSBs to be transmitted every period) may be provided within the first two subframes, e.g., within SF0, SF1. For example, SSB candidate locations 310 and 312 are provided within a first subframe (subframe 0 (SF0)), and SSB candidate locations 314 and 316 are provided within a second subframe (subframe 1 (SF1)). In this illustrative example, no SSB candidate locations are provided in the additional subframes, e.g., in subframes SF2, SF3, SF4, . . . SF19 (not shown), through the SSB period of subframes. For example, the SSB period of subframes may include 20 ms (20 subframes) and then repeat, e.g., with the 4 SSB candidate locations provided in SF0, SF1.

Also, as shown in FIG. 3, for the SSB configuration for FR1<3 Ghz with 4 SSBs and for case B, there are 4 SSB candidate locations provided within the first subframe of the period. Similarly, for FR1<6 GHz and 8 SSBs for case A, there are 8 SSB candidate locations (allowing up to 8 SSBs to be transmitted each period) provided within the first four subframes (two SSB candidate locations provided in each of the first four subframes of the period. These are merely some illustrative examples of SSB configurations, and other SSB configurations may be used.

According to an example embodiment, different SSBs may be sent via different beams in different time instances (e.g., in different OFDM symbols), and the UE can make separate measurements individually for every beam, i.e., for every timeslot. Also, for example, SSBs may be transmitted with a configurable periodicity, such as a periodicity of 5 ms, 10 ms, 20 ms, 40 ms, 80 ms or 160 ms. For example, the set of SSBs for the SSB configuration may be repeated every period (e.g., every 20 ms, if the period is 20 ms). For example, as shown in FIG. 3, for a period or periodicity of 20 ms, the 4 SSBS or 4SSB candidate locations (310, 312, 314, and 316, with 2 SSB candidate locations provided on each of the first two subframes, allowing up to a maximum of 4 SSBs to be transmitted each period) would repeat every 20 ms. Thus, in such an example, subframe 0 (SF0) and subframe 1 (SF1) (the first two subframes of the 20 ms period for this SSB configuration) would each include 2 SSBs (or 2 SSB candidate locations), while the other subframes 2-19 (SF2, SF3, . . . SF19) of the 20 ms period would not include SSB candidate locations, according to this illustrative example. Also, for example, for initial transmission, the UEs may search with periodicity of 20 ms, e.g., cells with a periodicity larger than 20 ms may not necessarily be found during initial phase and thus may typically be used subsequently, e.g., as secondary cells.

According to an example embodiment, for the various SSB configurations, within one period (e.g., within 20 ms, as an example period), all SSBs may be sent in a single half frame of 5 ms (five 1 ms subframes, of a 10 ms frame), either a first half of the frame (first 5 subframes of a 10 ms frame) or in the second half of a frame (the last 5 subframes of a 10 ms frame). FIG. 3 illustrates the candidate locations for SSBs within such a half frame. According to an example embodiment, the hatched or lined areas indicate OFDM symbols which can potentially be used for SSB transmission (SSB candidate locations), while the white areas indicate OFDM symbols without SSBs (without SSB candidate locations). For frequency range 1 (FR1) below 3 GHz, maximum 4 SSBs can be used, for FR1 above 3 GHz, max 8 SSBs can be used, and in FR2, max 64 SSBs can be used. The exact locations also depend on the selected subcarrier spacing (15 kHz or 30 kHz for FR1, 120 kHz or 240 kHz for FR2). Note that OFDM symbols are shorter with higher subcarrier spacing. Even though the figures look "SSB crowded", please recall that the figures only show the half frame with SSBs, which is only sent once in an SSB period (default 20 ms).

As described above, as an illustrative example embodiment, cell range expansion (CRE) for the small cell 212 may be performed by macro cell 210 reducing interference towards small cell 212 for one or more interference protected resources (e.g., one or more slots, frames, or symbols, for which the macro cell will omit or reduce interference towards the small cell 212). For example, as shown in FIG. 3, the macro cell 210 may reduce interference towards the small cell 212 on one or more of the subframes SF0-SF19, for a 20 subframe period (as an example), and where subframes SF0 and SF1 may include two SSB candidate locations for the transmission of SSBs, according to the 4 SSB example for case A. Thus, for example, one or more subframes, e.g., of the 20 subframes of a 20 ms period, may be selected by the macro cell 210 (or aggressor cell) to be interference protected resources (where the macro cell 210 will reduce interference towards the small cell 212 in such interference protected resources). A pattern (e.g., interference coordination pattern, which may include a list of bits, with one bit per 20 subframes) may be configured or selected by the macro cell 210 (or BS 204) and then signaled by BS 204/macro cell 210 to the small cell 212 to indicate which resources (e.g., which subframes, or other resources) are interference protected by macro cell 210 towards the small cell 212, and which resources are non-protected towards the small cell 212. As noted in the CRE (cell range expansion) example described above, it may be desirable for CRE UEs to perform cell measurements (e.g., for RLM, channel state information, beam detection or other purpose) of signals received from the small cell 212 based on SSBs transmitted via interference protected resource(s).

Therefore, it may be desirable for the aggressor cell (e.g., macro cell 210 or BS 204) to identify one or more interference protected resources (e.g., subframes for which the aggressor cell will reduce interference towards the small cell 212) on which a SSB may be transmitted by a victim cell (e.g., a resource that includes a SSB candidate location). Thus, according to an example embodiment, an aggressor cell (e.g., macro cell 210), in order to reduce interference and allow UEs to perform signal/cell measurements with respect to the small (or victim) cell 212 based on SSBs transmitted via interference protected resources, may select (or determine) one or more interference protected resources that include a SSB candidate location(s). Thus, an aggressor cell (e.g., macro cell 210, or BS 204 associated with macro cell 210) may determine, based on the SSB configuration (indicating which resources or subframes may include SSBs), one or more interference protected resources on which the macro cell may reduce interference, and on such interference protected resources the small cell may transmit one or more SSBs. For example, in the 4 SSB, case A SSB configuration example from FIG. 3 (e.g., if the victim/small cell 212 is using this SSB configuration for the transmission of SSBs), based on the SSB configuration for such case A/4 SSB example (4 SSB candidate locations, with 2 SSB candidate location in each of the first two subframes, SF0, SF1), the macro cell 210/BS 204 may select or identify at least one of SF0 and SF1 to reduce interference towards the small cell 212. In this manner, the victim cell 212 may transmit a SSB on at least one interference protected resource (e.g., on at least one of SF0 and/or SF1).

Thus, the aggressor cell, e.g., macro cell 210, may select one or more interference protected resources, based on a SSB configuration in the victim cell, and then indicate or signal these selected interference protected resources to the small cell 212, wherein at least one of the interference protected resources may be used by the small cell 212 to transmit a SSB. The small cell 212 may then configure (or send one or more RRC messages or other control information to the CRE UEs 220 to instruct) the CRE UEs to perform cell measurements (e.g., RLM) based on the SSB(s) received by the CRE UEs via the indicated interference protected resource(s), e.g., via SSBs received on SF0 and/or SF1 (whichever are indicated as being interference protected resources). Also, for example, non-CRE UEs may perform cell measurements based on SSBs received via non-protected resources, or SSBs received via interference protected resources. Although, in one example embodiment, CRE UEs may perform cell measurements and RLM based on SSBs received via interference protected resource(s), while non-CRE UEs may perform cell (or signal) measurements and RLM based on SSBs received via non-protected resources.

Also, according to an example embodiment, an aggressor cell (e.g., macro cell 210) may determine both at least one interference protected resource on which a victim (e.g., small) cell may transmit a first SSB, and at least one non-protected resource on which the victim (e.g., small) cell may transmit a second SSB. The first SSB transmitted via the interference protected resource may be used by CRE UEs to perform cell measurement and/or RLM, while the second SSB transmitted via a non-protected resource may be used by non-CRE UEs to perform cell measurement and/or RLM. For example, only SF0 may be selected as an interference protected resource towards the victim or small cell 212. Thus, macro cell 210 may send a message to small cell 212 indicating (e.g., via an interference coordination pattern) that SF0 is an interference protected resource, and SF1 is a non-protected resource, towards the small cell. The small cell 212 may already know or already be configured with the SSB configuration, e.g., the small cell already knows that SSB candidate locations are provided in both SF0 and SF1, for this particular SSB configuration. Thus, the small cell (or victim cell) 212 may transmit at least a first SSB (e.g., SSB 310 and/or 312) via SF0 (an interference protected resource), and may transmit a second SSB via SF1 (which is a non-protected resource in this example).

Also, in many cases, a different SSB may typically be transmitted via a different beam. See, e.g., FIG. 6, as an example. However, according to an example embodiment, two SSBs may be transmitted via a (same) beam (or via a set of one or more beams), with a SSB transmitted via an interference protected resource, and a SSB transmitted via a non-protected resource, with both SSBs transmitted via the same beam (or via the same set of beams). For example, for a first beam that overlaps with (or is provided in a direction of) a CRE area of a victim cell, the BS or victim cell may transmit two SSBs via the first beam, e.g., including a first SSB via an interference protected resource (aggressor cell reduces interference towards the victim cell for the interference protected resource) via the first beam, and a second SSB via a non-protected resource via the first beam. In this manner, a first set of UEs (e.g., CRE UEs) may use the first SSB transmitted via the interference protected resource and via the beam to perform cell measurement and RLM, and a second set of (e.g., non-CRE) UEs may use the second SSB transmitted via the non-protected resource to perform cell measurement and/or RLM. For example, Thus, the small cell (or victim cell) 212 may transmit at least a first SSB (e.g., SSB 310 and/or 312) via SF0 (an interference protected resource) via beam 8, and may transmit a second SSB via SF1 (which is a non-protected resource in this example) via beam 8 (via the same beam), e.g., where beam 8 may overlap with or be directed to a set of UEs (e.g., CRE UEs) that should or may perform cell or signal measurement based on SSBs transmitted via interference protected resources, and beam 8 may also overlap with or be directed to one or more UEs that may not necessarily use interference protected resources for cell measurement, but may use non-protected resources for cell measurement/signal measurement.

Thus, according to an example embodiment, a method may include determining, by a first base station (e.g., BS 204 associated with macro cell 210, for example) associated with a first cell (e.g., macro cell 210) based on a synchronization signal block (SSB) configuration indicating one or more resources (e.g., subframes, slots and/or symbols) on which a synchronization signal block (SSB) may be transmitted by a second cell (e.g., small cell 212), one or more interference protected resources on which the first cell (e.g., macro cell 210) will reduce interference towards the second cell; and sending, by the first base (e.g., BS 204 associated with macro cell 210) station associated with the first cell to a second base station (BS 206 associated with small cell) associated with the second cell (e.g., small cell 212), information identifying the one or more interference protected resources on which the first cell will reduce interference towards the second cell. The use of small cell and macro cell are merely examples, and the cells may be any size or type of cell.

According to an example embodiment, the determining one or more interference protected resources on which the first cell (e.g., macro cell 210) will reduce interference towards the second cell (e.g., small cell 212) may include determining, by the first base station (e.g., BS 206) associated with the first cell, based on the synchronization signal block (SSB) configuration, one or more interference protected resources (e.g., one or more interference protected subframes) on which a synchronization signal block (SSB) may be transmitted (e.g., one or more interference protected subframes that includes one or more SSB candidate locations) by the second cell and on which the first cell will reduce interference towards the second cell.

According to an example embodiment, the determining one or more interference protected resources on which the first cell will reduce interference towards the second cell may include: selecting, by the first base station (e.g., BS 204, associated with macro cell 210) associated with the first cell, an interference coordination pattern, of a plurality of predetermined interference coordination patterns, wherein each of the plurality of predetermined interference coordination patterns indicates one or more interference protected resources on which a synchronization signal block (SSB) may be transmitted by the second cell and on which the first cell will reduce interference towards the second cell.

According to an example embodiment, the interference coordination pattern may include a plurality of bits identifying the one or more interference protected resources (e.g., identifying the one or more interference protected subframes) on which the first cell (e.g., macro cell 210) will reduce interference towards the second cell (towards the small cell 212).

According to another example embodiment, the interference coordination pattern may identify both of: one or more of the interference protected resources on which a synchronization signal block (SSB) may be transmitted by the second cell; and one or more non-protected resources on which a synchronization signal block (SSB) may be transmitted by the second cell, wherein the one or more non-protected resources comprise resources on which the first cell may not reduce interference towards the second cell. For example, the pattern (e.g., interference coordination pattern) may include a plurality of bits, e.g., with 1 bit for each of a plurality of subframes (or for each of a plurality of resources, e.g., for each subframe of 20 subframes) with a 1 in the bit pattern indicating the resource (e.g., subframe) is an interference protected resource, and a 0 in the bit pattern indicating that the resource (e.g., subframe) is a non-protected resource, for example.

According to an example embodiment, the synchronization signal block (SSB) configuration indicates a plurality of candidate locations for synchronization signal blocks (SSBs), wherein a plurality of the synchronization signal blocks (SSBs) may be transmitted via a same beam using a subset of the candidate locations.

According to an example embodiment, the method may include reducing, by the first base station associated with the first cell, interference towards the second cell for the one or more interference protected resources. For example, reducing interference may include omitting or reducing a signal transmission for at least one of a particular time, on a particular frequency, or via a particular beam, that would cause interference towards the second cell, for the one or more interference protected resources.

According to an example embodiment, an aggressor cell (or BS associated with an aggressor cell (such as, for example, macro cell 212) may determine one or more patterns (e.g., interference coordination pattern) that indicates or represents one or more interference protected resources. The patterns may also indicate one or more non-protected resources. Also, for example, the pattern may be signaled from the aggressor cell to the victim cell (e.g., a message may be sent from BS 204 associated with macro cell/aggressor cell to BS 206 associated with small cell/ victim cell 212) indicating the pattern, e.g., that identifies one or more interference protected resources on which a SSB may be transmitted by the victim cell (e.g., indicating one or more interference protected resources that includes a SSB candidate location). As noted, an interference protected resource may include a resource (e.g., subframe, slot and/or symbol(s)) for which the aggressor cell (e.g., macro cell 212) reduces interference towards the victim cell (e.g., small cell 212). Thus, for example, the victim cell (e.g., BS 206 associated with small cell 212) may then configure measurement resource restrictions to its served UEs by configuring different SSBs for the interference protected resources and for the non-protected resources. This may allow a first set of UEs (e.g., CRE UEs) to measure SSB signals of the small cell 212 received via interference protected resource(s), and allows a second set of UEs (e.g., non-CRE UEs) to measure SSB signals of the small cell 212 received via non-protected resource(s), for example.

In other words, the victim (e.g., small) cell 212 (or BS 206 associated with such cell) may transmit two different SSBs for (or via) the same beam, including a first SSB transmitted on an interference protected resource via the beam, and a second SSB transmitted on a non-protected resource via the same beam. In the simplest case of an omni victim (small) cell without any beams, it would transmit 2 SSB (despite no beams being used).

The patterns representing the interference protected resources could be ABS patterns as in LTE. However, in NR (5G), a resource can also be protected by just sending a beam into another direction than the victim cell (that is, avoiding transmitting a signal via a beam that is in the direction of a victim cell, and transmitting that signal via other beams, that are in other directions that do not cause interference with the victim cell).

Thus, according to an example embodiment, one or more patterns may be designed or selected, e.g., by an aggressor BS/cell, such that it allows the victim cell to reuse the existing SSB design (e.g., the aggressor cell/BS may select the pattern (e.g., interference coordination pattern) based on the current/existing SSB configuration(s), e.g., so as to allow the victim cell to transmit/provide at least one SSB via an interference protected resource). For example, an aggressor cell may obtain or receive SSB information (e.g., which SSB configuration is used by the victim cell, and which half of a subframe the victim cell will transmit SSB(s)) from the victim cell, so that the aggressor cell/BS may determine at least one interference protected resource on which a SSB may be transmitted by the victim cell SSB, e.g., based on a SSB configuration used by the victim cell. In some example embodiments, the pattern may be determined on subframe level, or on slot level, or on symbol level, or in combination of them (e.g., interference protected resources may be provided or determined at the subframe, slot and/or symbol level).

In a first example embodiment, the victim (or small) cell may be an omni (omni-directional) cell, and the small cell does not use beamforming (the example is also valid for a sectorized small cell, but without beams). That is, it is typically operated with only a single SSB. Although according to an example embodiment, the victim (or small) cell may transmit at least two SSBs, e.g., including at least a first SSB transmitted via an interference protected resource, and e.g., a second SSB transmitted via a non-protected resource with respect to the small cell. Cell range expansion may also be used, for example.

Figure 4:
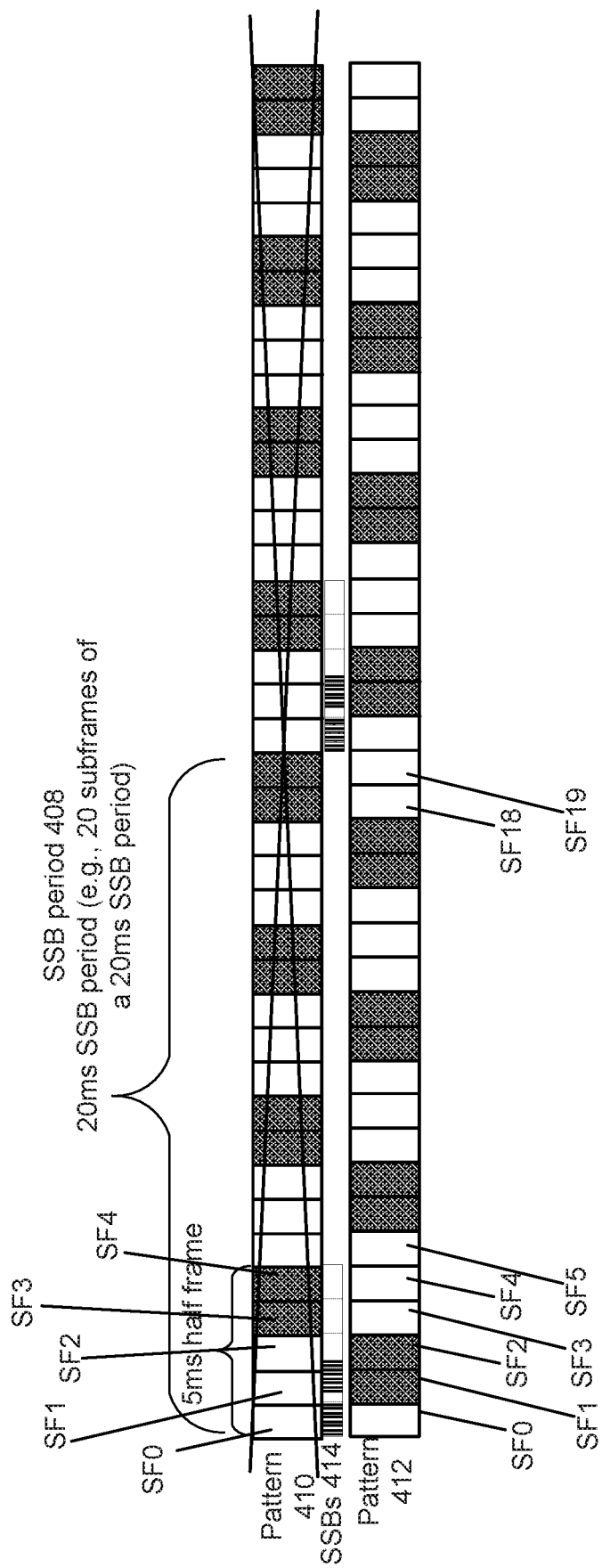
FIG. 4 is a diagram illustrating two patterns according to example embodiments.

FIG. 4 is a diagram illustrating two patterns according to example embodiments. FIG. 4 illustrates two patterns (e.g., interference coordination patterns) 410 and 412. A rectangle is provided to represent a resource, e.g., a 1 ms subframe. In this illustrative example, a 20 ms (20 subframe) SSB period is used for SSB transmission. For example, a SSB period 408 may include 20 subframes (SF0-SF19, for example), and then the subframes repeat. The first five 1 ms subframes are provided as a 5 ms half subframe. In patterns 410 and 412, the hatched/shaded rectangles identify resources (e.g., subframes) that are interference protected (e.g., where macro cell 210 reduces interference towards the small cell 212 for the interference protected resources, e.g., where ABS or blanked subframes may be used by macro cell, or subframes where at least one beam (e.g., in direction of small cell 212 or CRE UEs, or other interference reduction is performed by macro cell 210) may not be used by macro cell 210 that would interfere with the small cell 212), and white rectangles (white subframes) identify non-protected resources (non-protected subframes). SSBs 414 include dark or hatched lines that represent SSB candidate locations within at least some of the subframes.

For both pattern 410 and 412, SSB candidate locations (where SSBs may be transmitted) are provided for the first three subframes, e.g., SF0, SF1 and SF2. With respect to example pattern 410, the first three subframes (SF0, SF1 and SF2) are non-protected subframes, and the fourth and fifth subframes (SF3, SF4) are interference protected subframes. Thus, as shown in FIG. 4, pattern 410 does not meet the requirements for a pattern (interference coordination pattern) where an aggressor cell (e.g., BS 204 of macro cell 210) selects at least one interference protected resource that includes a SSB candidate. For example, SSB candidates are provided only for SF0, SF1 and SF2, whereas for pattern 410, only subframes SF3 and SF4 are interference protected subframes, within the first five subframes represented by the pattern 410 (SF0 and SF1 are non-protected). Thus, for pattern 410, there are no interference protected resources for which a victim cell (e.g., small cell 212) may transmit a SSB on such protected cell. Thus, according to an illustrative example embodiment, the pattern 410 is not acceptable, as it would not allow a cell to accommodate transmission of SSBs (e.g., for cell measurement and/or RLM) to a set of UEs (e.g., such as CRE UEs). Rather, in pattern 410, SSB candidate locations are only provided in non-protected resources (non-protected subframes). Hence, the X in FIG. 4 crosses out the pattern 410, as pattern 410 does not meet certain requirements or restrictions, e.g., since that pattern 410 does not allow a cell to transmit a SSB via an interference protected resource. Since macro and small cell is frame aligned, the small cell is not able to configure any SSB which would deliver SSB or cell measurements by a UE based on interference protected subframes. No matter whether the SSBs are sent in first or second half frame, all SSBs are located in non-protected subframes and thereby UEs (when measuring SSBs and/or performing RLM) will measure signals that include the full interference from the aggressor cell (e.g., from the macro cell 210), e.g., which may incorrectly cause and error for such UEs, such as a detected RLF.

Pattern 412 is another possible interference coordination pattern, and includes SSB candidate locations within the first three subframes (SF0, SF1, SF2) (just like pattern 410). For example, in this case, the pattern 412 is a time-shifted (cyclic shifted) version of pattern 410, where pattern 412 has been shifted to the left (earlier in time) by 2 subframes (e.g., by 2 ms), for example, so that at least one interference protected subframe will include a SSB candidate location. However, unlike pattern 410, the second and third subframes (SF1, SF2) of pattern 412 are interference protected subframes. Thus, within pattern 412, SF1 and SF2 provide interference protected resources (e.g., interference protected subframes) on which a SSB may be transmitted by a victim cell (e.g., by small cell 212). Thus, the pattern (e.g., interference coordination pattern) 412 may meet requirements that would allow a cell to transmit a SSB on one or more interference protected resources (via one or more interference protected subframes). In the example pattern 412, subframes SF0, SF3, SF4 are non-protected subframes, whereas subframes SF1 and SF2 are interference protected subframes. For both patterns 410 and 412, the 20 subframe pattern repeats after the first 20 subframes (e.g., after subframes SF0, SF1, . . . SF18, and SF19).

Figure 5:
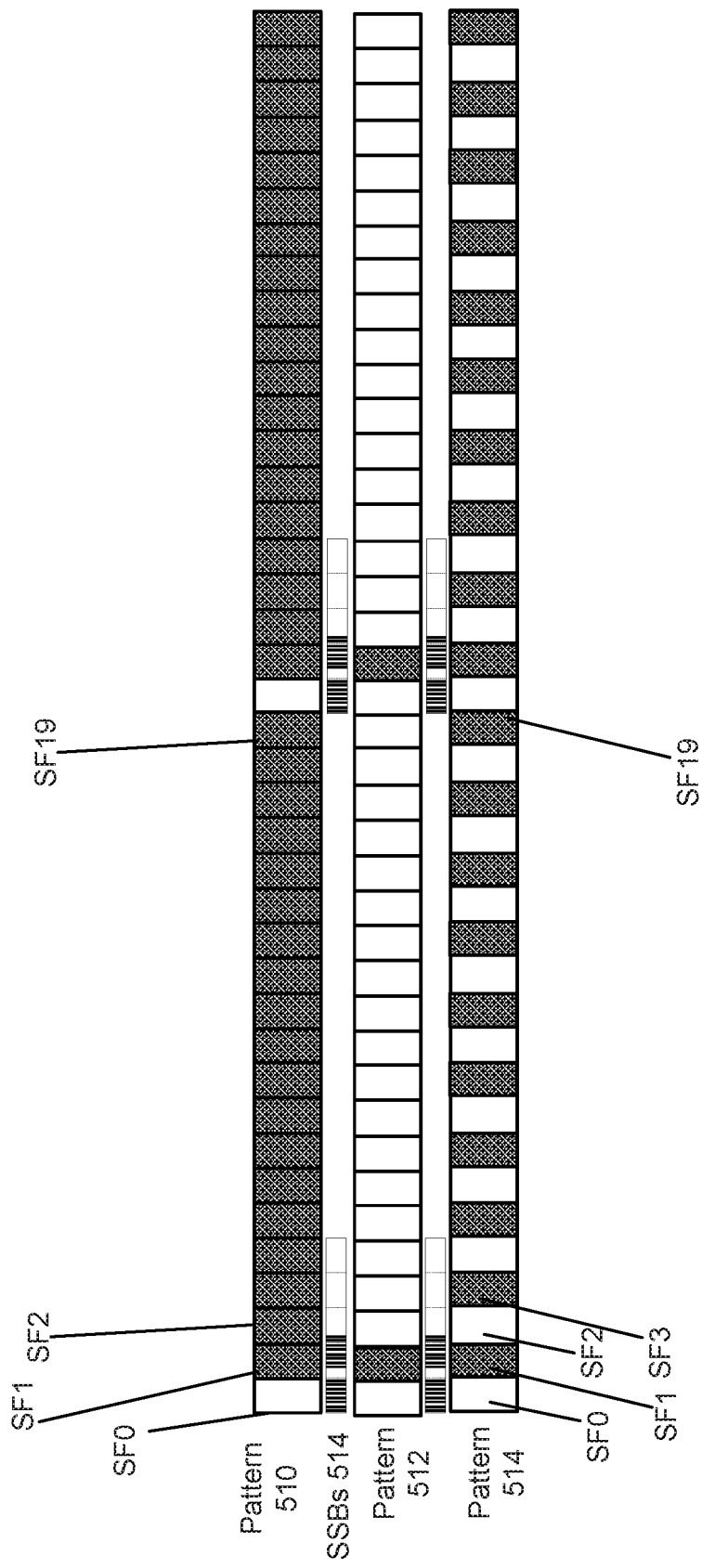
FIG. 5 is a diagram illustrating some example patterns according to an example embodiment.

FIG. 5 is a diagram illustrating some example patterns according to an example embodiment. A pattern, which may also be referred to as an interference coordination pattern, may indicate one or more interference protected resources and one or more non-protected resources. Some example interference coordination patterns are shown, including patterns 510, 512 and 514. SSBs 514 indicate that SSB candidate locations (for possible transmission of a SSB) are provided in subframes SF0, SF1 and SF2 (the first 3 subframes of each pattern). Each pattern may repeat after a period of 20 ms (20 subframes), for example. Pattern 510 indicates that the first subframe (SF0) within a period is a non-protected resource, while the other subframes SF1-SF19 are interference protected subframes. Thus, in example pattern 510, both subframes SF1 and SF2 are interference protected resources that include a SSB candidate location. In pattern 512, only subframe SF1 is an interference protected subframe, while subframes SF0 and SF2-SF19 are non-protected subframes. Also, in example pattern 514, every other (or half of the) subframe is an interference protected subframe. Thus, for example, in pattern 514, the even indexed subframes (e.g., SF0, SF2, SF4, . . . ) are non-protected resources, while the odd indexed subframes (SF1, SF3, SF5, . . . ) are interference protected resources. For all three patterns, there is at least one interference protected resource on which a cell (e.g., victim cell or small cell) may transmit a SSB. Other patterns may also be provided, as these are simply some examples.

In an example embodiment, a pattern (e.g., interference coordination pattern may be selected or determined one of multiple ways. For example, there may be a plurality of SSB-compatible predefined patterns, where SSB-compatible means that at least one interference protected resource of the pattern includes a SSB candidate location. If the plurality of predefined patterns are known by both BSs or both cells (e.g., BS 204 and BS 206), then the BS 204 for the aggressor cell or macro cell 210 may select one of the predefined patterns (e.g., pattern 512) and send information to another BS or cell (e.g., to BS 206 for small cell 212) that identifies the selected predefined pattern. Alternatively, the BS associated with the aggressor cell (e.g., BS 204 providing the macro cell 210) may design the pattern (e.g., freely selecting which subframes or resources that are interference protected, and which resources or subframes are non-protected), and then may send the pattern to another BS (e.g., to BS 206 associated with the victim cell or small cell 212) as a bit pattern, with one bit indicated for each resource or subframe, e.g., where a 1 indicates the subframe is an interference protected resource, and a 0 in the bit pattern indicates that the subframe is a non-protected resource.

Thus, the aggressor cell may select the pattern (e.g., one of the predefined interference coordination patterns, or designs the interference coordination patterns), signals or sends information to another cell or BS (e.g., to the BS 206 associated with the victim or small cell) indicating the selected pattern, and then applies the reduced interference towards the victim cell (e.g., towards the small cell 212).

According to an example embodiment, the victim cell may provide to the aggressor cell SSB information about the SSB configuration that it is currently using, or which it plans to use after the aggressor cell performs the interference protection (interference reduction). For example, the victim cell (e.g., BS 206 associated with the small cell 212) may indicate, e.g., a specific SSB configuration it is using, a specific half frame on which SSBs will be transmitted by the victim cell, and/or one or more specific candidate locations (e.g., specific symbols or symbol locations) within one or more subframes that the victim cell plans to use for the transmission of an SSB, or other SSB information that the aggressor cell may use to determine or select an interference coordination pattern, for example.

Figure 6:
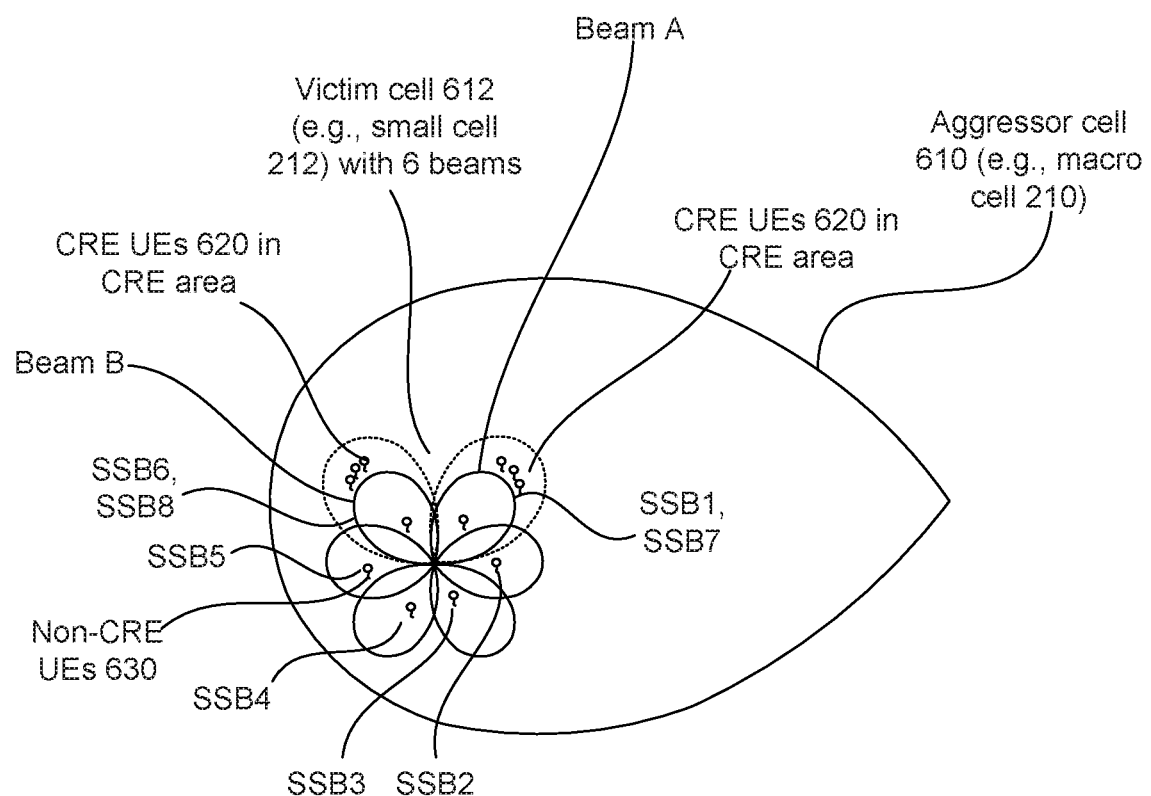
FIG. 6 is a diagram illustrating a small cell in which multiple beams may be transmitted according to an example embodiment.

FIG. 6 is a diagram illustrating a small cell in which multiple beams may be transmitted according to an example embodiment. As shown in FIG. 6, an aggressor cell 610 (e.g., macro cell 210) may reduce interference towards a victim cell 612 for one or more interference protected resources. Victim cell 612 (e.g., which may be a small cell 212) may use multiple beams to cover the cell. In this illustrative example, cell range expansion (CRE) areas are provided in which CRE UEs 620 may be provided. CRE areas may include areas where beams A and beam B cover, according to this illustrative example. For beam A, the victim cell 612 may transmit two SSBs via beam A, including SSB 1 via an interference protected resource and SSB7 via a non-protected resource. Likewise, for beam B, the victim cell 612 may transmit two SSBs via beam B, including SSB6 via an interference protected resource and SSB8 via a non-protected resource, for example. Because the other beams do not cover CRE UEs (that is the other beams, SSB2, SSB3, SSB4, SSB5 do not cover UEs that need to perform measurements based on SSBs transmitted via interference protected resources), only one SSB may be transmitted on those beams via a non-protected resource, for beams SSB2, SSB3, SSB4, SSB5.

SSB Collisions may occur, at least in some cases. As noted, the victim cell may be sending SSBs on one or more interference protected resources. Also, the aggressor cell may be sending SSBs on its own beams, and some of these transmitted SSBs may be on interference protected resources (protected by another cell). Thus, there may be some risk that the victim's SSBs and the aggressor's SSBs collide, i.e. if the aggressor cell selects the same SSB candidate location for a beam towards the victim/small cell, as the victim cell uses to transmit an SSB used for CRE UEs (transmitted via interference protected resources). Thus, in this collision situation, both aggressor cell and victim cell may have transmitted a SSB via a same SSB candidate location within an interference protected subframe. Thus, for example, in some cases, the victim cell may measure signals of SSB received via interference protected resources, but interference from the aggressor cell may nonetheless occur due to the collision of the SSB candidate locations for the aggressor cell and victim cell. Such a collision may cause dangerous inaccuracies in measurements (e.g. RSRP, RSRQ) based on the victim SSB, since the aggressor SSB at the same location may cause or induce strong interference to the victim SSB.

A possible solution to the risk of SSB collision may be for the aggressor cell to indicate to the victim cell the SSB locations out of the plurality of the SSB candidate locations (e.g., within the interference protected subframe/resources) the aggressor cell is planning to use to transmit SSBs, so that the victim cell may select different SSB candidate locations within the interference protected subframes than the SSB locations that will be used by the aggressor cell (and thus, avoid a SSB collision between slave cell and aggressor cell). Or, the victim cell may indicate to the aggressor cell the SSB locations that it is planning to use for SSB transmissions, so that aggressor cell may select different SSB candidate locations (and thus, avoid a SSB collision between slave cell and aggressor cell).

For example, the victim cell may receive this indication of SSB candidate locations used by aggressor cell, and then the victim cell may assign its own SSBs on the interference protected resources (or on SSB candidate locations) such that they don't collide with the aggressor's SSBs (e.g., victim cell may transmit SSBs within interference protected subframes on SSB candidate locations (e.g., symbols) that do not collide with the SSB locations used by the aggressor cell).

Figure 7:
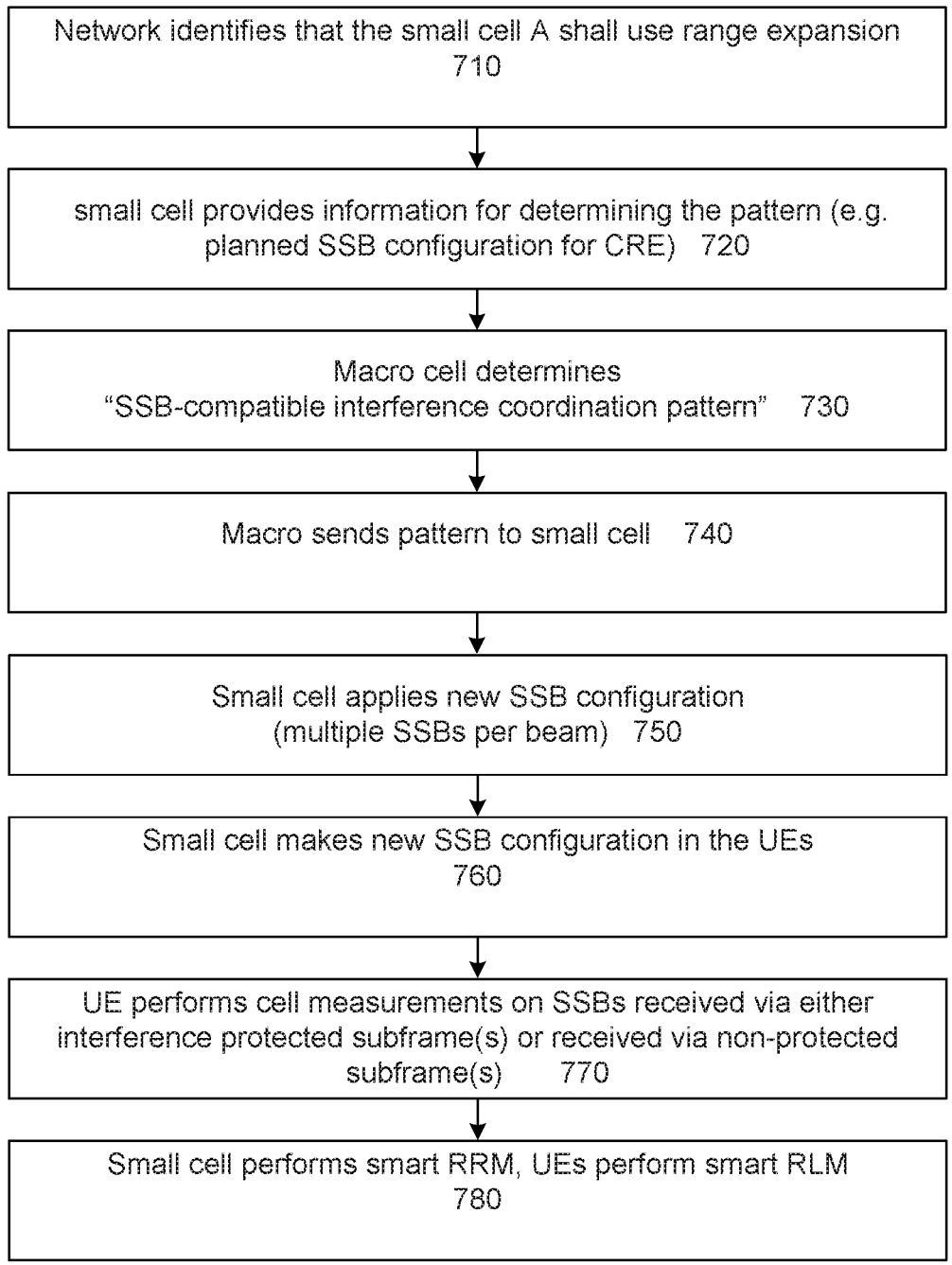
FIG. 7 is a flow chart illustrating operation according to an example embodiment.

FIG. 7 is a flow chart illustrating operation according to an example embodiment. At 710, the macro cell identifies that a small cell may or should use range expansion in order to improve the offloading for the macro cell. At 720, the victim cell (small) cell provides information for determining an interference coordination pattern, e.g., the SSB configuration that the small cell is currently using or planning to use in the range expansion case. At 730, aggressor (e.g., macro) cell determines "SSB-compatible" interference coordination patterns, i.e., recurring resources where it will produce significantly less interference towards the victim (small) cell. "SSB compatible" means that the patterns are selected such that the victim cell can transmit SSBs on interference protected resources, where the SSB candidate locations and/or subframes where SSBs may be transmitted may be fixed or known in advance. The pattern may be determined to be compatible with an SSB configuration used by the victim cell. The interference protected resources are not necessarily blanked (ABS), but some technique is used by the aggressor cell (e.g., macro cell) to reduce interference towards the victim cell, such as omitting a transmission via a beam that is directed towards the victim cell, performs ABS, or other interference reduction technique. At 740, the aggressor (macro) cell sends the patterns to small cell, e.g. via Xn interface. At 750, victim (small) cell applies new SSB configuration which is compatible to the pattern, whereas more than one SSB can be used for (transmitted via) the same beam, e.g., transmit a first SSB via an interface protected resource and via a first beam, and transmit a second SSB via a non-protected resource and via the same first beam. At 760, the victim (small) cell configures UEs with new SSB configuration. At 770, different UEs generate separate measurements for different SSBs, i.e., separate for interference protected resources and other resources (e.g., non-protected resource(s)). For example, a first set of UEs (e.g. CRE UEs) may perform cell measurement based on SSBs received via interference protected resources, and another set of UEs (e.g., non-CRE UEs) may perform cell measurement based on SSBs received via non-protected resources. At 780, the victim cell performs radio resource management using measurements based either on SSBs received via the interference protected resources (CRE-UEs), or on SSBs received via non-protected resources (other UEs), and the UE performs Radio Link Monitoring based either on SSBs received via interference-protected resources (CRE-UEs), or on SSBs received via non-protected resources (other UEs).

Figure 8:
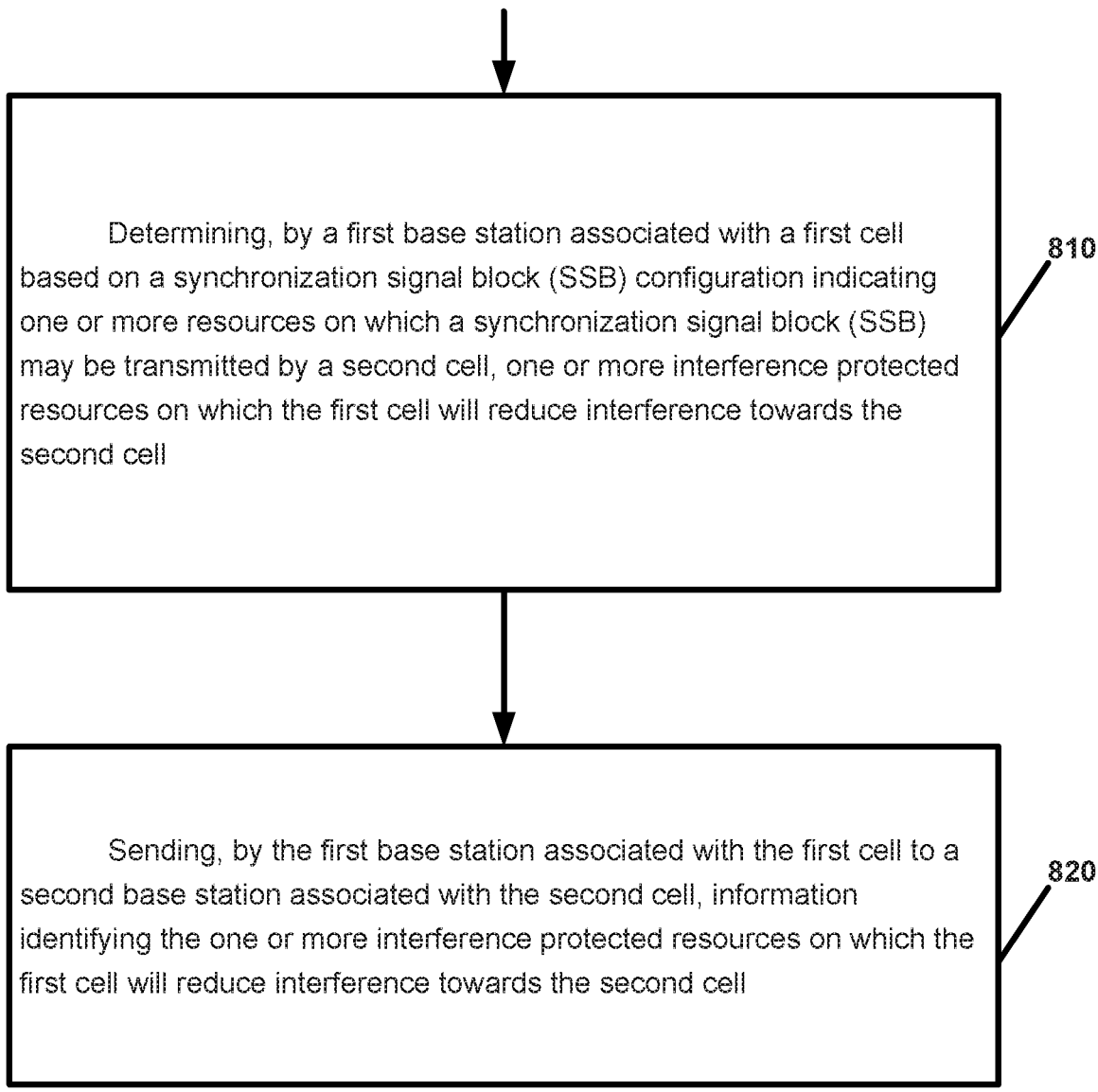
FIG. 8 is a flow chart illustrating operation of a base station according to an example embodiment.

Example 1. FIG. 8 is a flow chart illustrating operation of a base station according to an example embodiment. Operation 810 includes determining, by a first base station associated with a first cell based on a synchronization signal block (SSB) configuration indicating one or more resources on which a synchronization signal block (SSB) may be transmitted by a second cell, one or more interference protected resources on which the first cell will reduce interference towards the second cell. Operation 820 includes sending, by the first base station associated with the first cell to a second base station associated with the second cell, information identifying the one or more interference protected resources on which the first cell will reduce interference towards the second cell.

Example 2. The method of example 1, wherein the determining one or more interference protected resources on which the first cell will reduce interference towards the second cell comprises: determining, by the first base station associated with the first cell, based on the synchronization signal block (SSB) configuration, one or more interference protected resources on which a synchronization signal block (SSB) may be transmitted by the second cell and on which the first cell will reduce interference towards the second cell.

Example 3. The method of any of examples 1-2, wherein the determining one or more interference protected resources on which the first cell will reduce interference towards the second cell comprises: selecting, by the first base station associated with the first cell, an interference coordination pattern, of a plurality of predetermined interference coordination patterns, wherein each of the plurality of predetermined interference coordination patterns indicates one or more interference protected resources on which a synchronization signal block (SSB) may be transmitted by the second cell and on which the first cell will reduce interference towards the second cell.

Example 4. The method of any of examples 1-3, wherein the sending comprises: sending, by the first base station associated with the first cell to the second base station associated with the second cell, an interference coordination pattern including a plurality of bits identifying the one or more interference protected resources on which the first cell will reduce interference towards the second cell.

Example 5. The method of any of examples 1-4, wherein the sending comprises sending an interference coordination pattern that identifies both: one or more of the interference protected resources on which a synchronization signal block (SSB) may be transmitted by the second cell; and one or more non-protected resources on which a synchronization signal block (SSB) may be transmitted by the second cell, wherein the one or more non-protected resources comprise resources on which the first cell may not reduce interference towards the second cell.

Example 6. The method of any of examples 1-5 wherein the synchronization signal block (SSB) configuration indicates a plurality of candidate locations for synchronization signal blocks (SSBs), wherein a plurality of the synchronization signal blocks (SSBs) may be transmitted via a same beam using a subset of candidate locations.

Example 7. The method of any of examples 1-6, comprising: reducing, by the first base station associated with the first cell, interference towards the second cell for the one or more interference protected resources.

Example 8. The method of example 7, wherein the reducing interference comprises: omitting or reducing a signal transmission for at least one of a particular time, on a particular frequency, or via a particular beam, that would cause interference towards the second cell, for the one or more interference protected resources.

Example 9. The method of any of examples 1-8, wherein the determining comprises at least one of: determining, by the first base station, one or more interference protected resources based on a predefined set of patterns; or determining, by the first base station, one or more interference protected resources based on a predefined set of rules that allow usage or transmission of synchronization signal blocks (SSBs) by the second cell via the interference protected resources.

Example 10. The method of any of examples 1-9, wherein the determining comprises: determining, by the first base station, one or more interference protected resources based on information received by the first base station from the second base station with respect to the second cell.

Example 11. The method of example 10, wherein the determining comprises: determining, by the first base station, one or more interference protected resources based on at least one of the following synchronization signal block (SSB) information received by the first base station from the second base station with respect to the second cell: information indicating a half frame that the second cell is using or is planning to use for synchronization signal block (SSB) transmission; or information indicating one or more resources on which a synchronization signal block (SSB) may be transmitted that the second cell is using or planning to use for synchronization signal block (SSB) transmission.

Example 12. The method of any of examples 1-11, further comprising: sending, by the first base station to the second base station, information about at least one synchronization signal block that is transmitted by the first cell.

Example 13. An apparatus comprising means for performing the method of any of examples 1-12.

Example 14. A non-transitory computer-readable storage medium comprising instructions stored thereon that, when executed by at least one processor, are configured to cause a computing system to perform the method of any of examples 1-12.

Example 15. An apparatus comprising: at least one processor; and at least one memory including computer program code; the at least one memory and the computer program code configured to, with the at least one processor, cause the apparatus at least to perform the method of any of examples 1-12.

Figure 9:
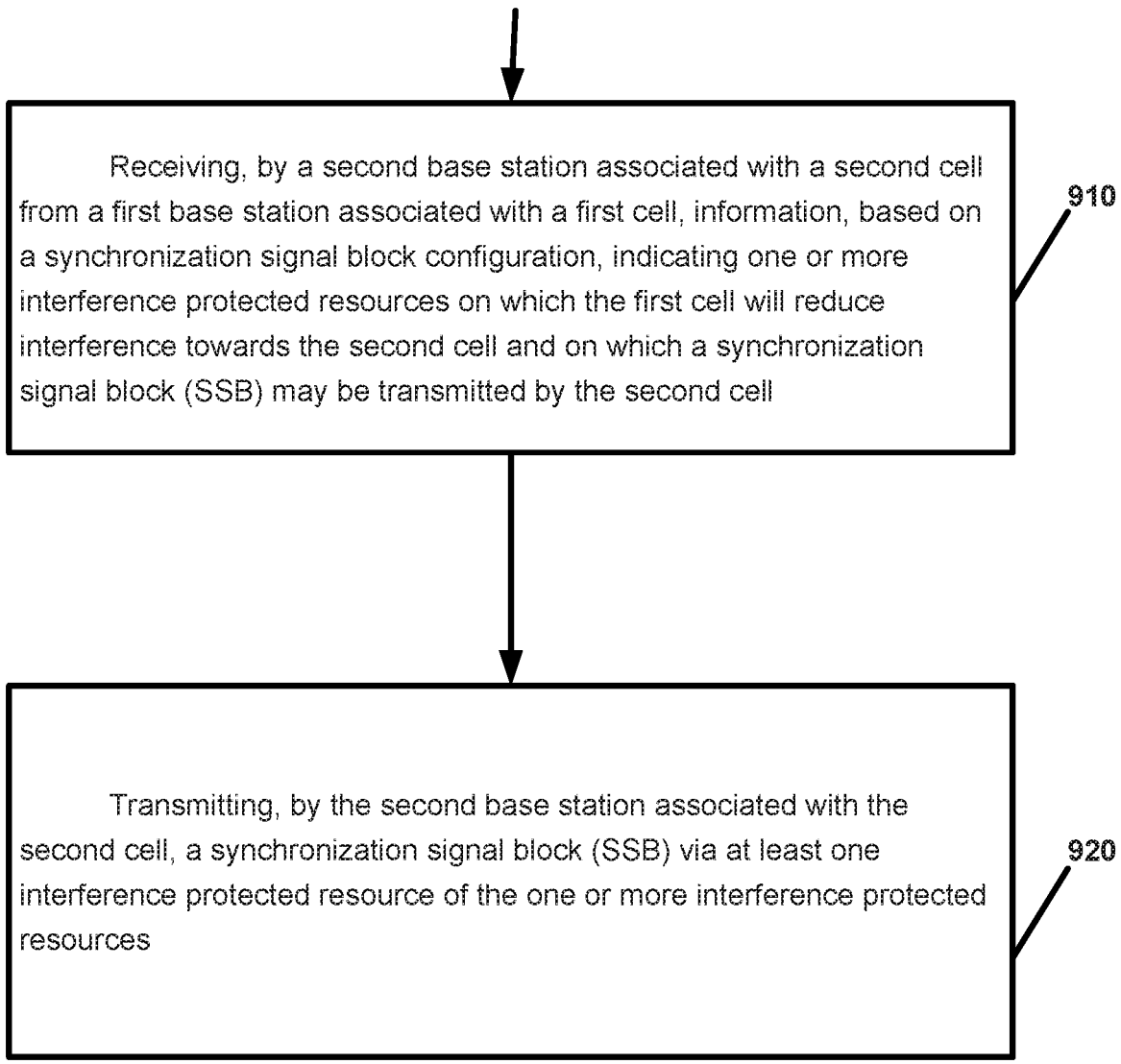
FIG. 9 is a flow chart illustrating operation of a base station according to another example embodiment.

Example 16. FIG. 9 is a flow chart illustrating an operation of a base station according to another example embodiment. Operation 910 includes receiving, by a second base station associated with a second cell from a first base station associated with a first cell, information, based on a synchronization signal block configuration, indicating one or more interference protected resources on which the first cell will reduce interference towards the second cell and on which a synchronization signal block (SSB) may be transmitted by the second cell. Operation 920 includes transmitting, by the second base station associated with the second cell, a synchronization signal block (SSB) via at least one interference protected resource of the one or more interference protected resources.

Example 17. The method of example 16 wherein the receiving comprises receiving information that identifies both: one or more interference protected resources on which the first cell will reduce interference towards the second cell and on which a synchronization signal block (SSB) may be transmitted by the second cell; and one or more non-protected resources on which the first cell may not reduce interference towards the second cell and on which a synchronization signal block (SSB) may be transmitted by the second cell.

Example 18. The method of any of examples 16-17 wherein the synchronization signal block (SSB) configuration indicates a plurality of candidate locations for synchronization signal blocks (SSBs), further comprising transmitting a plurality of the synchronization signal blocks (SSBs) via a same beam.

Example 19. The method of any of examples 16-18, wherein the second cell includes a plurality of beams, the method comprising: transmitting, by the second base station, a plurality of synchronization signal blocks (SSBs) via each of one or more beams, including: transmitting a first synchronization signal block (SSB) on an interference protected resource, of the one or more interference protected resources, via a first set of one or more beams; and transmitting, by the second base station, at least a second synchronization signal block (SSB) on a non-protected resource, of the one or more non-protected resources, via the first set of one or more beams.

Example 20. The method of any of examples 16-19, wherein the receiving comprises: receiving, by the second base station associated with the second cell from the first base station associated with the first cell, an interference coordination pattern including a plurality of bits identifying the one or more interference protected resources on which the first cell will reduce interference towards the second cell and on which a synchronization signal block (SSB) may be transmitted by the second cell.

Example 21. The method of any of examples 16-20, wherein the receiving comprises: receiving, by the second base station associated with the second cell from the first base station associated with the first cell, information indicating an interference coordination pattern, of a plurality of predefined interference coordination patterns, wherein each of the plurality of interference coordination patterns indicates at least one or more interference protected resources on which a synchronization signal block (SSB) may be transmitted by the second cell and on which the first cell will reduce interference towards the second cell.

Example 22. The method of any of examples 16-21, comprising: transmitting, by the second base station, configuration information to configure one or more user equipments (UEs) to perform measurements and radio link monitoring for the second cell based only on synchronization signal blocks (SSBs) transmitted via the interference protected resources.

Example 23. The method of any of examples 16-22, wherein the second cell includes a plurality of beams, and wherein one or more user equipments (UEs) within the second cell are designated as cell range expansion user equipments, the method further comprising: transmitting, by the second base station to the one or more cell range expansion user equipments, configuration information identifying one or more of the interference protected resources on which a synchronization signal block (SSB) may be transmitted, to configure the one or more cell range expansion user equipments to perform radio link monitoring for the second cell based only on synchronization signal blocks (SSBs) transmitted via the interference protected resources.

Example 24. The method of any of examples 16-23, further comprising: receiving, by the second base station from the first base station, information about at least one synchronization signal block that is transmitted by the first cell; and selecting, by the second base station, a location of the at least one synchronization signal block that may be transmitted by the second cell on an interference-protected resource such that the at least one synchronization signal block that may be transmitted by the second cell does not collide with the at least one synchronization signal block transmitted by the first cell.

Example 25. An apparatus comprising means for performing the method of any of examples 16-24.

Example 26. A non-transitory computer-readable storage medium comprising instructions stored thereon that, when executed by at least one processor, are configured to cause a computing system to perform the method of any of examples 16-24.

Example 27. An apparatus comprising: at least one processor; and at least one memory including computer program code; the at least one memory and the computer program code configured to, with the at least one processor, cause the apparatus at least to perform the method of any of examples 16-24.

Figure 10:
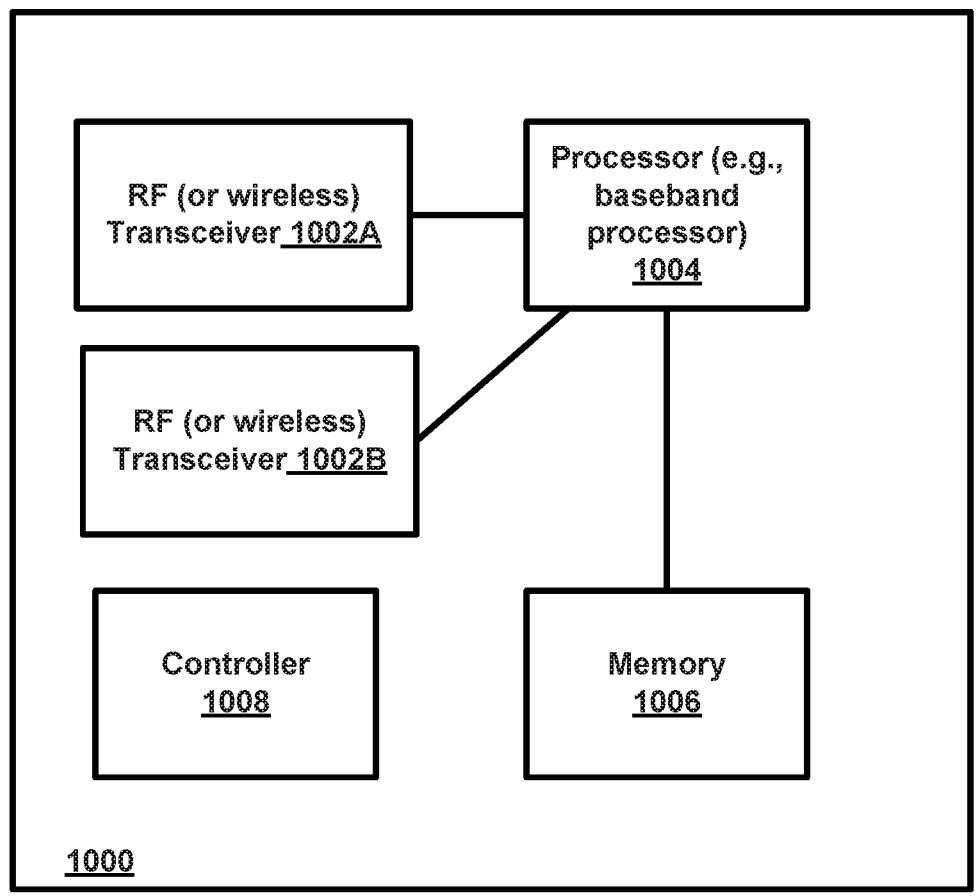
FIG. 10 is a block diagram of a wireless station (e.g., AP, BS, RAN node, UE or user device, or other network node) according to an example embodiment.

FIG. 10 is a block diagram of a wireless station (e.g., AP, BS or user device/UE, or other network node) 1000 according to an example embodiment. The wireless station 1000 may include, for example, one or more (e.g., two as shown in FIG. 10) RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 10, a controller (or processor) 1008 may execute software and instructions, and may provide overall control for the station 1000, and may provide control for other systems not shown in FIG. 10, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example embodiment, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    determining, by a first base station associated with a first cell based on a synchronization signal block (SSB) configuration indicating one or more resources on which the SSB may be transmitted by a second cell, one or more interference protected resources on which the first cell will reduce interference towards the second cell, wherein the determining comprises:
        determining, by the first base station associated with the first cell, based on the SSB configuration, a first interference protected resource on which the SSB may be transmitted by the second cell and on which the first cell will reduce interference towards the second cell;
        determining, by the first base station, a second interference protected resources based on the following SSB information received by the first base station from a second base station with respect to the second cell: information indicating a half frame that the second cell is using or is planning to use for SSB transmission; and information indicating one or more resources on which the SSB may be transmitted that the second cell is using or planning to use for SSB transmission;
        selecting, by the first base station associated with the first cell, an interference coordination pattern of a plurality of predetermined interference coordination patterns, wherein the selected predetermined interference coordination pattern indicates a third interference protected resource on which the SSB may be transmitted by the second cell and on which the first cell will reduce interference towards the second cell; and
        determining, by the first base station, a fourth interference protected resource based on a predefined set of rules that allow usage or transmission of SSBs by the second cell via the interference protected resources; and
    sending, by the first base station associated with the first cell to the second base station associated with the second cell, information identifying the first, second, and third interference protected resources on which the first cell will reduce interference towards the second cell, wherein the sending comprises:
        sending an interference coordination pattern that identifies one or more of the first, second, and third interference protected resources on which the SSB may be transmitted by the second cell and one or more non-protected resources on which the SSB may be transmitted by the second cell, wherein the one or more non-protected resources comprise resources on which the first cell may not reduce interference towards the second cell.

2. The method of claim 1, wherein the sending comprises: sending, by the first base station associated with the first cell to the second base station associated with the second cell, an interference coordination pattern including a plurality of bits identifying the first, second, and third interference protected resources on which the first cell will reduce interference towards the second cell.

3. The method of claim 1, wherein the SSB configuration indicates a plurality of candidate locations for SSBs, wherein a plurality of the SSBs are transmitted via a same beam using a subset of candidate locations.

4. The method of claim 1, further comprising: reducing, by the first base station associated with the first cell, interference towards the second cell for the one or more interference protected resources.

5. The method of claim 4, wherein the reducing interference comprises: omitting or reducing a signal transmission for at least one of a particular time, on a particular frequency, or via a particular beam, that would cause interference towards the second cell, for the one or more interference protected resources.

6. The method of claim 1, wherein the determining comprises: determining, by the first base station, the fourth interference protected resource based on information received by the first base station from the second base station with respect to the second cell.

7. The method of claim 1, further comprising: sending, by the first base station to the second base station, information about at least one synchronization signal block that is transmitted by the first cell.

8. A first base station comprising:
    at least one processor; and
    at least one memory including computer program code;
    the at least one memory and the computer program code configured to, with the at least one processor, cause the first base station at least to perform:
        determining, by the first base station associated with a first cell based on a synchronization signal block (SSB) configuration indicating one or more resources on which the SSB may be transmitted by a second cell, one or more interference protected resources on which the first cell will reduce interference towards the second cell, wherein the determining comprises:
            determining, by the first base station associated with the first cell, based on the SSB configuration a first interference protected resource on which the SSB may be transmitted by the second cell and on which the first cell will reduce interference towards the second cell;

determining, by the first base station, a second interference protected resources based on the following SSB information received by the first base station from a second base station with respect to the second cell: information indicating a half frame that the second cell is using or is planning to use for SSB transmission; and information indicating one or more resources on which the SSB may be transmitted that the second cell is using or planning to use for SSB transmission;

selecting, by the first base station associated with the first cell, an interference coordination pattern, of a plurality of predetermined interference coordination patterns, wherein the selected predetermined interference coordination pattern indicates a third interference protected resource on which the SSB may be transmitted by the second cell and on which the first cell will reduce interference towards the second cell; and determining, by the first base station, a fourth interference protected resource based on a predefined set of rules that allow usage or transmission of SSBs by the second cell via the interference protected resources; and sending, by the first base station associated with the first cell to the second base station associated with the second cell, information identifying the first, second, and third interference protected resources on which the first cell will reduce interference towards the second cell, wherein the sending comprises:

sending an interference coordination pattern that identifies one or more of the first, second, and third interference protected resources on which the SSB may be transmitted by the second cell and one or more non-protected resources on which the SSB may be transmitted by the second cell, wherein the one or more non-protected resources comprise resources on which the first cell may not reduce interference towards the second cell.

9. The first base station of claim 8, wherein the SSB configuration indicates a plurality of candidate locations for the SSBs, wherein a plurality of the SSBs are transmitted via a same beam using a subset of candidate locations.

10. The first base station of claim 8, wherein the sending further comprises: sending, by the first base station associated with the first cell to the second base station associated with the second cell, an interference coordination pattern including a plurality of bits identifying the first, second, and third interference protected resources on which the first cell will reduce interference towards the second cell.

11. The first base station of claim 8, wherein the determining further comprises: determining, by the first base station, the fourth interference protected resource based on information received by the first base station from the second base station with respect to the second cell.

12. The first base station of claim 8, wherein the at least one memory and the computer program code are further configured to, with the at least one processor, cause the first base station at least to reduce, by the first base station associated with the first cell, interference towards the second cell for the one or more interference protected resources.

13. The first base station of claim 12, wherein the reducing interference comprises: omitting or reducing a signal transmission for at least one of a particular time, on a particular frequency, or via a particular beam, that would cause interference towards the second cell, for the one or more interference protected resources.

14. The first base station of claim 8, wherein the at least one memory and the computer program code are further configured to, with the at least one processor, cause the first base station at least to send, by the first base station to the second base station, information about at least one synchronization signal block that is transmitted by the first cell.

15. A system comprising:
a first base station;
a second base station;
at least one processor; and
at least one memory including computer program code;
the at least one memory and the computer program code configured to, with the at least one processor, cause the first base station to perform:

determining, by the first base station associated with a first cell based on a synchronization signal block (SSB) configuration indicating one or more resources on which the SSB may be transmitted by a second cell, one or more interference protected resources on which the first cell will reduce interference towards the second cell, wherein the determining comprises:

determining, by the first base station associated with the first cell, based on the SSB configuration, a first interference protected resource on which the SSB may be transmitted by the second cell and on which the first cell will reduce interference towards the second cell;

determining, by the first base station, a second interference protected resources based on the following SSB information received by the first base station from a second base station with respect to the second cell: information indicating a half frame that the second cell is using or is planning to use for SSB transmission; and information indicating one or more resources on which the SSB may be transmitted that the second cell is using or planning to use for SSB transmission;

selecting, by the first base station associated with the first cell, an interference coordination pattern, of a plurality of predetermined interference coordination patterns, wherein the selected predetermined interference coordination pattern indicates a third interference protected resource on which the SSB may be transmitted by the second cell and on which the first cell will reduce interference towards the second cell; and determining, by the first base station, a fourth interference protected resource based on a predefined set of rules that allow usage or transmission of SSBs by the second cell via the interference protected resources; and sending, by the first base station associated with the first cell to the second base station associated with the second cell, information identifying the first, second, and third interference protected resources on which the first cell will reduce interference towards the second cell, wherein the sending comprises:

sending an interference coordination pattern that identifies one or more of the first, second, and third interference protected resources on which the SSB may be transmitted by the second cell and one or more non-protected resources on which the SSB may be transmitted by the second cell, wherein the one or more non-protected resources comprise resources on which the first cell may not reduce interference towards the second cell.

16. The system of claim 15, wherein the at least one memory and the computer program code are further configured to, with the at least one processor, cause the first base station at least to reduce, by the first base station associated with the first cell, interference towards the second cell for the one or more interference protected resources.

17. The system of claim 16, wherein the reducing interference comprises: omitting or reducing a signal transmission for at least one of a particular time, on a particular frequency, or via a particular beam, that would cause interference towards the second cell, for the one or more interference protected resources.

18. The system of claim 15, wherein the SSB configuration indicates a plurality of candidate locations for SSBs, wherein a plurality of the SSBs are transmitted via a same beam using a subset of candidate locations.

* * * * *